United States Patent
Sechrist

(10) Patent No.: US 7,223,710 B1
(45) Date of Patent: May 29, 2007

(54) CYCLIC CATALYST REGENERATION PROCESS USING A CIRCULATING STREAM FOR DESORPTION

(75) Inventor: Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 542 days.

(21) Appl. No.: 10/624,220

(22) Filed: Jul. 22, 2003

Related U.S. Application Data

(63) Continuation-in-part of application No. 10/007,853, filed on Nov. 5, 2001, now Pat. No. 6,790,802.

(51) Int. Cl.
*B01J 20/34* (2006.01)

(52) U.S. Cl. .............................. 502/35; 502/36; 502/37; 502/50; 502/52; 502/53; 208/139; 208/140

(58) Field of Classification Search ................... 502/35, 502/36, 37, 50, 52, 53; 208/139, 140; 95/132; 423/240 S
See application file for complete search history.

(56) References Cited

U.S. PATENT DOCUMENTS

| | | | | |
|---|---|---|---|---|
| 5,336,834 | A | 8/1994 | Zarchy et al. | 585/737 |
| 5,837,636 | A * | 11/1998 | Sechrist et al. | 502/35 |
| 5,965,473 | A * | 10/1999 | Sechrist et al. | 502/35 |
| 6,034,018 | A * | 3/2000 | Sechrist et al. | 502/35 |
| 6,117,809 | A | 9/2000 | Sechrist et al. | 502/35 |
| 6,123,833 | A * | 9/2000 | Sechrist et al. | 208/134 |
| 6,153,091 | A * | 11/2000 | Sechrist et al. | 208/139 |
| 6,461,992 | B1 * | 10/2002 | Sechrist et al. | 502/35 |
| 6,784,132 | B1 * | 8/2004 | Sechrist | 502/37 |
| 6,790,802 | B1 * | 9/2004 | Sechrist | 502/37 |
| 6,881,391 | B1 * | 4/2005 | Sechrist | 423/240 S |

* cited by examiner

*Primary Examiner*—Steven Bos
(74) *Attorney, Agent, or Firm*—James C Paschall; Michael A Moore

(57) ABSTRACT

A process in which halogen is recovered from a cyclic operation for regenerating hydrocarbon conversion catalysts is disclosed. The process uses an arrangement of beds of adsorbent and a circulating stream to return the halogen-containing materials to a regeneration circuit.

20 Claims, 1 Drawing Sheet

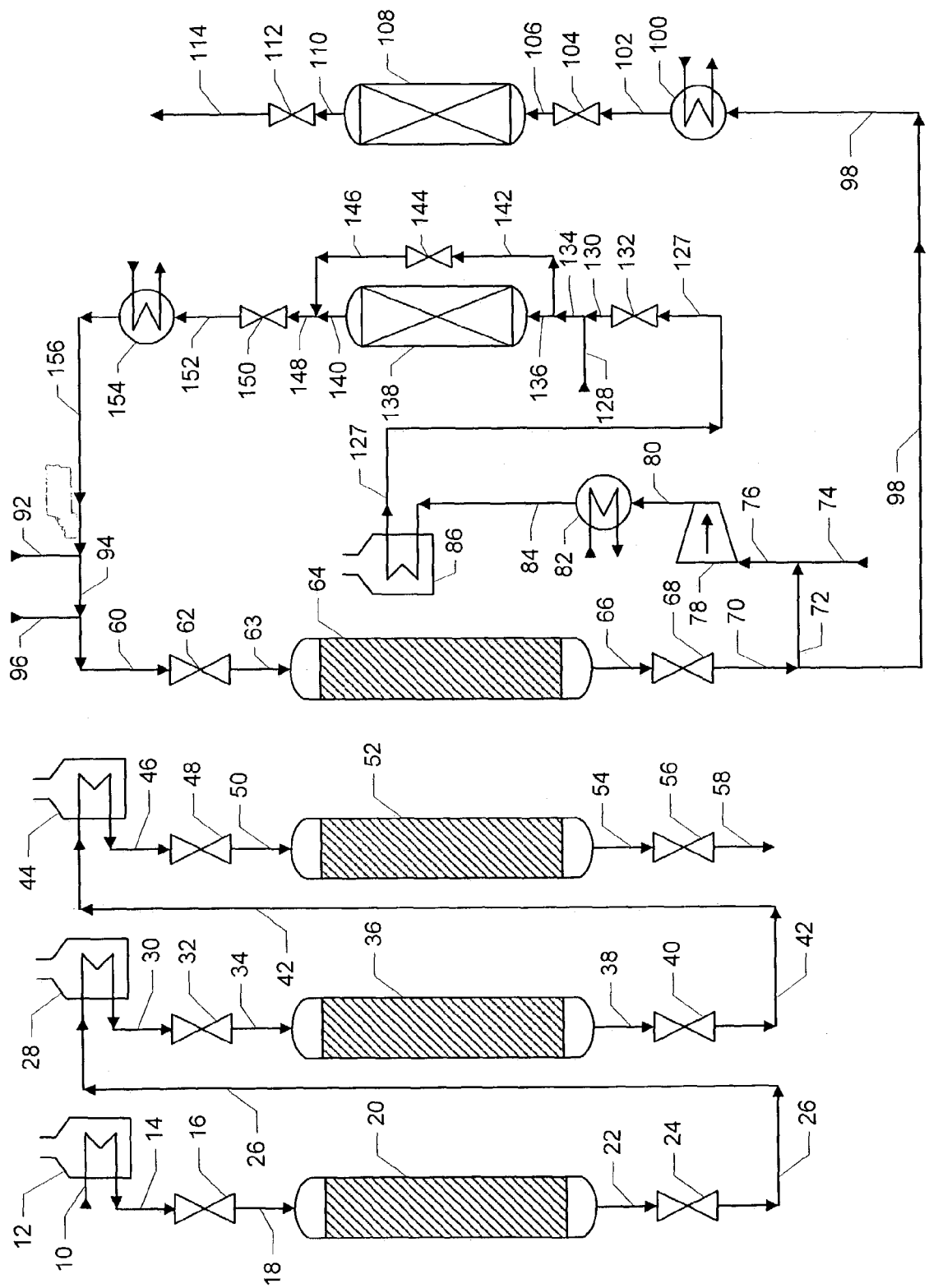

CYCLIC CATALYST REGENERATION PROCESS USING A CIRCULATING STREAM FOR DESORPTION

CROSS-REFERENCE TO RELATED APPLICATION

This application is a continuation-in-part of U.S. application Ser. No. 10/007,853, filed Nov. 5, 2001, the entire teachings of which are hereby incorporated herein by reference.

FIELD OF THE INVENTION

The process disclosed herein relates generally to the regeneration of hydrocarbon conversion catalysts in the presence of halogen.

BACKGROUND OF THE INVENTION

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of carbonaceous material or coke upon the catalyst, sintering or agglomeration or poisoning of catalytic metals on the catalyst, and/or loss of catalytic metal promoters such as halogens. Consequently, these catalysts are typically reactivated in a process called regeneration. Reactivation can thus include, for example, removing coke from the catalyst by burning, redispersing catalytic metals such as platinum on the catalyst, oxidizing such catalytic metals, reducing such catalytic metals, replenishing catalytic promoters such as chloride on the catalyst, and drying the catalyst.

One of the problems during regeneration of halogen-containing catalysts is loss of halogen itself from the catalyst. This happens when the catalysts are contacted with gases that, while regenerating the catalyst, tend also to remove halogen from the catalyst.

U.S. Pat. No. 5,965,473 discloses a method for recovering chlorine-containing materials from the effluent gases during catalyst regeneration in a hydrocarbon conversion process with a cyclic regeneration operation. To prevent loss of chlorine-containing materials, U.S. Pat. No. 5,965,473 uses one of the off-stream catalyst beds. This is an inefficient use of the vessel that contains the off-stream catalyst bed as well as of the catalyst itself, both of which could be better used for promoting hydrocarbon conversion reactions. Therefore, more efficient methods are sought to decrease the loss of halogen during halogen-containing catalyst regeneration.

SUMMARY OF THE INVENTION

The process disclosed herein is a catalyst regeneration process that uses a material bed to remove halogen from a vent stream of the process and to return halogen to the process.

The halogen may be removed from the stream being vented and retained on the material in the bed by any chemical or physical interaction between the halogen and the bed. Such interactions include but are not limited to adsorption and/or absorption. To simplify the description that follows, this interaction is referred to herein as "adsorption" and the material in the bed is referred to herein as an "adsorbent." The removal of halogen from the adsorbent is referred to herein as "desorption."

The bed(s) of adsorbent are contacted with streams and/or at conditions that are typically different from those used during hydrocarbon conversion. The process disclosed herein does not use one of the hydrocarbon conversion reactors along with its catalyst to adsorb and desorb the halogen.

The process disclosed herein can improve the regeneration of halogen-containing hydrocarbon conversion catalysts and recover halogen-containing materials that are present during catalyst regeneration. The process disclosed herein improves the utilization of equipment and catalysts used in hydrocarbon conversion processes such as reforming, isomerization, and dehydrogenation, and improves the efficiency of cyclic catalyst regeneration processes.

In one embodiment, the process disclosed herein is a process for regenerating a hydrocarbon conversion catalyst in the presence of halogen. Part of the halogen-containing effluent of a catalyst bed undergoing regeneration contacts an adsorbent bed, which adsorbs halogen. Another part of the effluent contacts an adsorbent bed to desorb halogen and return halogen to the catalyst.

Other embodiments and objects are described in the detailed description of the invention.

INFORMATION DISCLOSURE

U.S. Pat. No. 5,336,834 (Zarchy et al.) discloses an adsorption zone in combination with a catalytic hydrocarbon conversion process that keeps chlorine-containing compounds in the catalyst bed and prevents contamination of product streams with chlorine-containing compounds. The entire teachings of U.S. Pat. No. 5,336,834 are hereby incorporated herein by reference.

U.S. Pat. No. 5,965,473 (Sechrist et al.) discloses a method for recovering chlorine-containing materials from the effluent gases during catalyst regeneration in a hydrocarbon conversion process with a cyclic regeneration operation. The entire teachings of U.S. Pat. No. 5,965,473 are hereby incorporated herein by reference.

U.S. Pat. No. 6,117,809 (Sechrist et al.) discloses a method for recovering chlorine-containing materials removed from a chloride-containing catalyst undergoing reduction by using a sorption zone which contains catalyst. The entire teachings of U.S. Pat. No. 6,117,809 are hereby incorporated herein by reference.

BRIEF DESCRIPTION OF THE DRAWING

The drawing is a process flow diagram showing an embodiment of the invention.

DETAILED DESCRIPTION

The process disclosed herein recovers halogen removed from hydrocarbon conversion catalysts undergoing cyclic catalyst regeneration. Halogen is present in an effluent stream from a catalyst bed undergoing regeneration. A portion of the effluent stream contacts adsorbent to remove halogen. Halogen is removed from adsorbent using another portion of the effluent stream and producing a stream that can be used in regeneration. When this stream containing halogen removed from the adsorbent is used in regeneration, halogen is returned to the catalyst.

The adsorbent disclosed herein uses at least one adsorbent. The adsorbent removes at least one halogen from a portion of the effluent stream. Any suitable adsorbent may be used. Suitable adsorbents include molecular sieves such as zeolites, clays, inorganic polymers such as alumina and activated alumina, zirconia, carbon, activated carbon, organic polymers such as resin adsorbent, etc. Suitable aluminas include gamma, alpha, theta, etc. One embodiment uses the ion exchanged clinoptilolites described in U.S. Pat. No. 5,336,834. These adsorbents may not be equal in terms of their capabilities of removing halogen or of having halogen removed from them.

In one embodiment, the adsorbent is selected so that its operating conditions (i.e., temperature, pressure, halogen concentration, and water concentration) during adsorption or desorption correspond either to regeneration conditions or to conditions that can be readily attained from the regeneration conditions. For example, adsorption conditions that correspond to the regeneration conditions but for a lower temperature and/or pressure can be easily attained by passing the vent gas from the coke combustion bed through a cooler and/or a pressure-reducing valve.

In one embodiment, the adsorbent's select physical properties that affect reversible adsorption do not degrade significantly when the adsorbent is used for adsorption and desorption. For example, in one embodiment when an adsorbent with a high surface area is used, the repeated use of the adsorbent for adsorption and desorption does not significantly decrease the adsorbent's surface area. Thus, while silica gel may be used as the adsorbent, it is typically not used. The adsorbent may contain a Periodic Table Group 8–10 element or a noble metal component such as gold, silver, platinum, palladium iridium, rhodium, mercury, ruthenium, or osmium. In one embodiment the adsorbent contains less than 0.1 wt-%, and in another embodiment none, of the metal, based on the weight of the adsorbent. References herein to the Periodic Table are to the new notation of the Periodic Table of the Elements in the inside front cover of the CRC Handbook of Chemistry and Physics, 80$^{th}$ Edition, 1999–2000, CRC Press, Boca Raton, Fla. The adsorbent may be a catalyst, such as a hydrocarbon conversion catalyst. The adsorbent may even have substantially the same composition as the catalyst particles that are used in any reaction zone. More than one adsorbent may be used. Multiple adsorbents may be combined into a composite material, or they may be used without compositing, such as in a physical admixture of two adsorbents.

In addition to reversibly adsorbing at least one halogen, the adsorbent may also reversibly adsorb water. Generally, water is present along with halogen in the regeneration effluent stream from which halogen is recovered. Generally, the conditions that result in reversible adsorption of halogen also result in reversible adsorption of water. However, the presence of water can affect, sometimes adversely, the adsorption of halogen, because water can compete with halogen for sites on the adsorbent.

The process disclosed herein is believed to be applicable to a wide range of catalytic hydrocarbon conversion processes and the regeneration of their catalysts, including aromatic isomerization, paraffin or olefin isomerization, paraffin dehydrogenation, and alkylation. However, catalytic reforming is the most widely practiced hydrocarbon conversion process which uses cyclic catalyst regeneration and to which the process disclosed herein applies. Reforming catalysts typically contain a halogen, such as chlorine. Catalytic reforming is described in U.S. Pat. No. 5,965,473, the entire teachings of which are hereby incorporated herein by reference.

The process disclosed herein is applicable to many of the individual regeneration steps that typically comprise a cyclic regeneration operation of a catalytic reforming process. These include coke combustion, redispersion of catalytic metal on the catalyst, rehalogenating of the catalyst, drying of the catalyst, and reduction of catalytic metal on the catalyst. Except for drying, these steps are described in U.S. Pat. No. 5,965,473. Drying can occur by contacting the catalyst with a gas containing oxygen, hydrogen, nitrogen, or a $C_1$–$C_5$ hydrocarbon, or a mixture thereof, under conditions such that water is transferred from the catalyst to the gas. Preferably the gas does not react with the catalyst, any component thereof, or any deposit thereon. Drying conditions usually comprise an elevated temperature and/or a reduced pressure and/or an elevated gas hourly space velocity, including the temperatures, pressures, and gas hourly space described for the other regeneration steps in U.S. Pat. No. 5, 965,473. Usually the water-containing effluent from the drying step is itself dried and then recycled to the catalyst bed to further dry the catalyst. Drying of the effluent usually takes place first by cooling the gas and then condensing the water and/or by contacting the gas with a desiccant. When drying involves cooling the gas, the gas is normally reheated prior to recycling.

The drawing shows a cyclic reforming process using three on-stream reactors 20, 36, and 52, and a fourth off-stream reactor 64 which is undergoing regeneration. Only the equipment and lines necessary for an understanding of the invention are shown in the drawing. The reactors have inlet lines 18, 34, 50, and 63 containing valves 16, 32, 48, and 62, which can be opened or closed to start or stop flow to each reactor. They also have outlet lines 22, 38, 54, and 66 containing valves 24, 40, 56, and 68, which can be opened or closed to start or stop flow from each reactor. Well-known equipment and lines (not shown) connect the reactors to each other so that each on-stream reactor can be taken off-stream and regenerated in the place of off-stream reactor 64, and so that the off-stream reactor 64 can be placed on-stream and function as any of the on-stream reactors. Although this description is mainly in terms of three on-stream reactors and one off-stream reactor, there may of course be more or fewer on-stream reactors or off-stream reactors, and some off-stream reactors may have already undergone regeneration, while others may be awaiting regeneration.

A combined feed stream comprising naphtha and hydrogen flows through line 10, is heated in heater 12, passes through line 14, valve 16, and line 18, and enters reactor 20, where reforming reactions occur. Reactor 20 effluent flows through line 22, valve 24, and line 26. Since reforming reactions are generally endothermic the effluent is heated in heater 28, and the heated effluent flows through line 30, valve 32, and line 34, and into reactor 36. Effluent from reactor 36 flows through line 38, valve 40, and line 42, is heated in heater 44, flows through lines 46, valve 48, and line 50, and enters reactor 52. Reactor 52 effluent flows through line 54, valve 56, and line 58 to conventional product separation and recovery facilities (not shown).

The catalyst in off-stream reactor 64 is undergoing regeneration using a recirculating regeneration system that uses two beds 108 and 138 containing adsorbent such as alumina. Adsorbent bed 108 operates in adsorption mode and adsorbent bed 138 operates in desorption mode. Adsorption bed 108 has an inlet line 106 containing valve 104, which can be opened or closed to start or stop flow to the bed. Adsorption bed 108 also has outlet line 110 containing valve 112, which can be opened or closed to start or stop flow from the bed. Desorption bed 138 has an inlet line 136, another inlet line 134 upstream, yet another inlet line 130 further upstream that contains inlet valve 132, an outlet line 140, and another outlet line 148 downstream which contains valve 150. Desorption bed also has a line 128 for introducing a make-up stream to the junction of inlet lines 130 and 134. In addition, desorption bed 138 has bypass lines 142 and 146 and bypass valve 144, which can be opened or closed to start or stop bypass flow around desorption bed 138. Well-known equipment and lines (not shown) connect the beds to each other so that the bed 108 in adsorption mode can be placed in desorption mode, and so that bed 138 in desorption mode can be placed in adsorption mode.

The following description is mainly in terms of the regeneration step being coke combustion, but this is not intended to limit the scope of the process disclosed herein as set forth in the claims. Regenerant gas (also referred to herein as combustion gas) comprising oxygen, nitrogen, and a halogen (such as chlorine or fluorine) in the form of a halogen-containing material (e.g., hydrogen chloride and/or molecular chlorine) flows at an elevated temperature through line 60, valve 62, and line 63, and enters reactor 64. Since the combustion of coke deposits on the catalyst in reactor 64 is generally exothermic, the reactor 64 effluent gas (also referred to herein as flue gas) is hotter than the combustion gas. More importantly for the process disclosed herein, the flue gas contains halogen, such as in the form of one or more halogen-containing materials that have been removed from the catalyst by the coke combustion, usually because of the combined effect of gas contacting, heat release, and any water produced. The flue gas flows through line 66, valve 68, and line 70.

Since the flue gas stream contains carbon dioxide byproduct from coke combustion, a minor portion of these vapors is withdrawn from the recirculating gases through line 98. The remaining (major) portion of these vapors recirculates by flowing through line 72, where it combines with an oxygen-containing make-up stream (usually air) in line 74. In one embodiment, the flue gas portions flowing in lines 98 and 72 are each aliquot portions of the flue gas stream flowing in line 70. An aliquot portion of a stream is a portion of the stream that has substantially the same composition as the stream. Line 76 carries this gas stream to compressor 78, which discharges into line 80. Depending on how much heat from coke combustion and compression is carried by the gas stream flowing in line 80, that stream may be cooled in exchanger 82, heated in heater 86, or both. Because the major portion of the flue gas is recycled to the inlet of off-stream reactor 64 using compressor 78, whether or not exchanger 82 or heater 86 or both are needed depends mainly on the outlet temperature of off-stream reactor 64 and the desired inlet temperature of bed 138. Exchanger 82 can cool the flue gas flowing in line 80 by indirect heat transfer using water or air as a cooling medium. The gas stream from exchanger 82 flows through line 84. Exchanger 82 is operated so that the temperature of the stream flowing in line 84 is such that, when the gas stream in line 84 is mixed with other gas streams described below to form the desorption inlet gas stream flowing in line 136, the gas stream is at the desired desorption temperature for the inlet of desorption bed 138. If, however, the gas stream flowing in line 84 is relatively cool and as a result the inlet temperature for bed 138 is less than the desired temperature, heater 86 may be used to heat the gases flowing in line 84 to attain the desired desorption inlet temperature.

The portion of the flue gas that flows through line 98 contains halogen-containing material to be recovered in adsorption bed 108. The flue gas enters heat exchanger 100, which cools the flue gas stream by indirect heat exchange using water or air as a cooling medium. The flue gas stream then flows through line 102, valve 104, and line 106, and enters bed 108, which contains adsorbent. Adsorbent bed 108 is operating in adsorption mode, and the adsorbent adsorbs at least some of the halogen from the cooled flue gas. The adsorption effluent flows through line 110, valve 112, and is vented from the process through line 114. If desired, this vented stream can be sent to conventional facilities (not shown) to neutralize any residual halogen that may be present in the stream. However, one of the advantages of the process disclosed herein is that the residual halogen content of the adsorption effluent is so relatively low that the need for such an additional neutralization step is often eliminated.

Prior to being placed in adsorption mode, the bed of adsorbent 108 had operated in desorption mode in the position of bed of adsorbent 138. While the bed 108 was in desorption mode, the halogen on the adsorbent was desorbed and passed to the off-stream reactor (e.g., reactor 64) that was undergoing regeneration at the time. This desorption depleted the adsorbent in bed 108 of halogen, and thereby prepared the adsorbent in bed 108 for use in adsorption mode. Conversely, prior to being placed in desorption mode the bed 138 had operated in adsorption mode in the position of bed 108. While the bed 138 was in adsorption mode, halogen from the off-stream reactor that was undergoing regeneration at the time was adsorbed on the adsorbent. This adsorption added halogen to the adsorbent in bed 138, and thereby prepared the adsorbent in bed 138 for use in desorption mode.

Gas for desorbing halogen from bed 138 flows through line 127, valve 132, and line 130 and combines with any make-up stream flowing in line 128. This make-up stream is optional and its use and composition may depend on the regeneration step in progress. In the case of coke combustion or metal oxidation, the make-up gas may be, for example, an oxygen-containing gas such as air or a diluent gas such as nitrogen. In the case of drying, the make-up gas may be a diluent gas such as nitrogen, hydrogen, or a $C_1$–$C_5$ hydrocarbon. In the case of metal reduction, the make-up gas may be hydrogen. Such make-up gases may be added if needed to the process as a make-up stream through line 128. The make-up stream can be used to add water (or a compound that forms water) to the gases in order to help halogen desorption. The stream flowing in line 134 flows through line 136, and enter bed 138, which contains adsorbent containing halogen. Bed 138 operates in desorption mode, and halogen on the adsorbent is desorbed and exits with the effluent of desorption bed 138. When desired, a portion of the gases flowing through line 134 may be made to bypass desorption bed 138 through lines 142 and 146, provided that bypass valve 144 is open.

Desorption bed 138 effluent flows through line 140, combines with any bypass flow in line 146, and flows through line 148, valve 150, and line 152. The stream flowing in line 152 may be cooled using exchanger 154, if needed to achieve the desired inlet temperature for off-stream reactor 64. After any cooling, the desorption effluent stream flows through line 156.

The stream in line 156 combines with a make-up stream (if any) in line 92. The make-up stream can be used to add additional halogen to the stream flowing in line 156 to produce the gas stream flowing in line 94. Averaged over time, the amount of halogen added through line 92 is approximately equal to the amount of halogen vented from the process with the adsorption effluent flowing in line 114. But at any particular point in time, the amount of halogen added through line 92 is usually what is needed to attain the desired molar ratio of water to halogen at the inlet of the off-stream reactor 64 for regeneration purposes.

The gas flowing in line 94 combines with another make-up stream (if any) in line 96. The make-up stream in line 96 can be used to add additional water (or a compound that forms water after being added, such as an alcohol) to the stream flowing in line 94 to produce the combustion gas (regeneration gas) flowing in line 60. The amount of water (or compound that forms water) added through line 96 is usually what is needed to attain the desired molar ratio of water to halogen at the inlet of the off-stream reactor 64 for regeneration purposes.

In one embodiment, the difference between the temperature of the stream flowing in line 63 and the temperature of the stream flowing in line 140 is less than about 20° C. In another embodiment, the difference between the molar ratio of water to halide in the stream flowing in line 63 and the molar ratio of water to halide in the stream flowing in line 140 is less than about 20:1.

The operating conditions for the process disclosed herein are determined by many factors, but a primary factor is the regeneration conditions of the off-stream reactor. The regeneration conditions for the off-stream reactor 64 usually include an inlet temperature, an inlet gas hourly space velocity, an inlet oxygen concentration, and an inlet molar ratio of water to halogen of the combustion gases flowing in line 63, a peak or maximum temperature of the catalyst bed in off-stream reactor 64, and an outlet temperature of the flue gases flowing in line 66. In practice, when the halogen is chlorine the molar ratio of water to halogen is the molar ratio of water to chloride. Of course, the specific target values of each of these regeneration variables depends on the composition and nature of the catalyst being regenerated, on the process and mechanical details of the off-stream reactor 64 and other associated equipment (such as exchangers 82 and 100 and compressor 78), and on the regeneration step that is actually taking place. A person of ordinary skill in the art is able to determine the values of these regeneration variables.

The desired inlet conditions of off-stream reactor 64 may or may not be the same, or substantially the same, as the outlet conditions of desorption bed 138. Changes in the composition and outlet conditions of the stream flowing in line 140 can have a relatively large effect on the inlet conditions of off-stream reactor 64. The desorption outlet conditions may be such that the gas flowing in line 140 provides the desired inlet conditions for off-stream reactor 64. In that case, the bypass valve 144 would be closed, and there would be neither heat exchange by heat exchanger 154, nor halogen addition through line 92, nor water addition through line 96. To achieve those, or any of the possible outlet conditions for the desorption bed 138 without undue experimentation, a person of ordinary skill in the art can monitor the desorption conditions and adjust the inlet conditions of the desorption bed 138 as necessary. The inlet temperature is set by the heater 86. Generally, the desorption temperature is higher than the adsorption temperature and above about 66° C. (150° F.). The desorption temperature is usually from about 260° C. (500° F.) to about 538° C. (1000° F.). The inlet gas hourly space velocity is set by the flow rates of the portion of the flue gas through line 72 and any make-up streams in lines 74 and 28, taking into account any bypass flow through lines 142 and 146. The inlet oxygen concentration to desorption bed 138 is typically set by the make-up air addition (if any) via line 74. The inlet molar ratio of water to halogen is preferably as high as possible (i.e., little or no halogen in the inlet gas) since any halogen in the inlet gas to desorption bed 138 would deter desorption. However, this molar ratio is not one that a person of ordinary skill in the art practicing the process disclosed herein would typically control. This is because this ratio is essentially the same as that of the flue gas exiting the off-stream reactor 64, which in turn is determined in large part by the previously-mentioned inlet conditions to off-stream reactor 64 and by the regeneration reactions that take place in the off-stream reactor 64.

With bed 138 in desorption mode, the outlet conditions of desorption bed 138 will change over time. This might happen because the adsorbent in desorption bed 138 has become depleted of halogen, resulting in a gradual and ultimately unacceptable increase in the molar ratio of water to halogen in the desorption outlet gas. When this occurs, the positions of bed 138 and bed 108 may be switched, so that bed 138 is used for adsorption, and adsorption bed 108 is used for desorption. Prior to switching, the desorption bed 138 may be pre-cooled to the desired temperature for adsorption by introducing a coolant gas into the bed inlet via line 128. In one embodiment, the coolant gas has little or no water and halogen (e.g., little or no hydrogen chloride or molecular chlorine).

The duration of time that a bed of adsorbent is in desorption mode and the frequency at which the bed is switched from desorption mode depends on many factors. These factors include the desorption conditions, the type and amount of adsorbent, the type of halogen or halogen-containing materials on the adsorbent, the residual or minimum capacity of the adsorbent for halogen at desorption conditions, the halogen content of the adsorbent, the molar ratio of water to halogen in the stream entering the bed of adsorbent, and the halogen concentration in the effluent of the bed of adsorbent. The halogen content in the desorption effluent is usually at least 1 wt-%, more commonly at least 10 wt-%, greater than the halogen concentration in the desorption inlet. If less halogen is desorbed from a bed of adsorbent, the bed is removed from desorption mode and replaced with another bed.

It may be desirable to extend the time that a bed of adsorbent is in desorption mode while still maintaining the outlet conditions of the desorption bed the same, or substantially the same. One possible way of simultaneously achieving these two objectives is to add water (or a compound that forms water after being added, such as an alcohol) to the gases that enter the desorption bed 138. Water in the inlet gases to desorption bed 138 helps desorb halogen from the adsorbent, and this is beneficial when the halogen content of the desorption outlet gases declines as the desorption bed 138 becomes depleted of halogen. Although the point of water introduction to the process could be anywhere downstream of line 72 and upstream of desorption bed 138, it is preferred to add water at a point where the process temperature is relatively high, such as through line 128 downstream of heater 86.

Another way of not only extending the time that a bed of adsorbent is in desorption mode but also maintaining substantially constant outlet conditions of the desorption bed is to use two beds containing adsorbent in a parallel flow arrangement for desorption. Initially, only one bed of adsorbent is being desorbed, and all of the desorption gases flow to that one bed. However, as that desorption bed becomes depleted of halogen, the halogen content in that bed's effluent declines. When the composition of the desorption effluent is no longer the same, or substantially the same, as the desired composition of the regeneration inlet, a second bed of adsorbent is placed in a parallel flow arrangement with the first bed, and some of the desorption gases are routed to the second bed. While both beds are being desorbed, the flow rate of the desorption gases to the two beds is split so that a greater portion of the desorption gases flows to the first, more-depleted bed and a smaller portion of the desorption gases flows to the second, less depleted bed. In this way, the increase in halogen contributed by desorption of the second bed makes up for the decline in halogen contribution from the first bed, so that the total amount of halogen to the off-stream reactor is constant. Accordingly, the first bed of adsorbent may remain in desorption mode for a longer period of time than it could have remained if it alone was used to achieve the desired inlet conditions of the off-stream reactor. When the first bed is sufficiently depleted of halogen, the second desorption bed functions as the first desorption bed, and a third desorption bed replaces and functions as the second desorption bed.

The adsorption conditions are generally selected in order to recover a target or desired fraction of the total amount of the halogen that flows in line 98. In the embodiment shown in the drawing, that total amount of halogen is equal to the amount of halogen that enters the adsorption bed 108 in line 106, and the amount of halogen that is lost (i.e., not recovered) is the amount of halogen in the gas stream that exits the adsorption bed 108 and then exits the process in line 114. Since the flow rates and halogen concentrations of the streams entering and leaving the adsorption bed 108 may vary with time, halogen recovery is determined by time-averaging the amount of halogen entering and exiting the adsorption bed 108. Thus, the amount of halogen entering the adsorption bed 108 can be computed by measuring the flow rates and halogen concentrations of the inlet stream at specified times, plotting a curve representing the product of each flow-rate-concentration data pair versus time, and then integrating the area under the curve. The amount of halogen leaving the adsorption bed 108 can be computed in a similar way, and the halogen recovery is the quotient of the amount leaving divided by the amount entering, expressed as a percentage and subtracted from 100%. Halogen recovery is generally greater than about 80 wt-% and preferably greater than 90 wt-%.

The halogen recovery is determined by many factors. The molar ratio of water to halogen of the inlet gas to the adsorption bed 108 certainly affects the recovery, but this operating variable is not one that a person of ordinary skill in the art practicing the process disclosed herein would typically control. This is because this ratio is essentially the same as that of the flue gas exiting the off-stream reactor 64, which in turn is determined in large part by the previously-mentioned inlet conditions to off-stream reactor 64 and by the regeneration reactions that take place in the off-stream reactor 64. Generally, as the molar ratio of water to halogen increases, halogen recovery decreases. The molar ratio of water to hydrogen halide in the stream entering the adsorbent bed being used for adsorption is usually more than about 5:1, and depending on the catalyst being regenerated in the reactor as well as other factors, this molar ratio could conceivably be as high as about 50:1 or 100:1.

A second factor affecting halogen recovery is the halogen content of the adsorbent at the start of the adsorption step. Generally, as the initial halogen content increases, the halogen recovery decreases. This initial halogen content is the same as the final halogen content of the adsorbent used for desorption, since the bed of adsorbent that is used for adsorption had previously been used for desorption. For this reason, the extent to which halogen is desorbed during the desorption step can influence the halogen recovery in the adsorption step. But, for the same reason, this variable cannot be independently controlled once the desorption step is finished and the adsorption step begins.

A third variable that can be independently adjusted to affect halogen recovery during adsorption is the adsorption temperature. Adsorption temperature can be controlled by regulating exchanger 100. Generally, recovery increases as adsorption temperature decreases. Thus, if during adsorption, the halogen recovery drops below the desired target, the adsorption temperature may be decreased to the low end of the range of adsorption temperatures.

The operating temperature for adsorption mode is generally lower than that for desorption mode. The adsorption temperature is usually above about 66° C. (150° F.). The adsorption temperature is usually no higher than the outlet temperature of the reactor that is undergoing regeneration, but usually it is lower than that by at least 55° C. (100° F.) due to heat exchange between the outlet of the off-stream reactor 64 and the inlet of the desorption bed 108. Only rarely would the adsorption temperature exceed 482° C. (900° F.). In one embodiment, the adsorption temperature is from about 149° C. (300° F.) to about 260° C. (500° F.). The adsorption temperature is generally maintained above the dew point temperature of the flue gas in order to minimize the possibility of condensing corrosive acidic liquid in the adsorption equipment. Also, the adsorption temperature is preferably maintained above the capillary condensation temperature of the flue gas, which is the temperature at which condensation from the flue gas occurs in the capillaries of the adsorbent. The capillary condensation temperature is usually higher than the dew point temperature of the bulk flue gas.

The capillary condensation temperature depends on many factors, including not only the composition of the flue gas but also the chemical and physical properties of the adsorbent, such as the distribution of pore size and volume. When there are differences in the physical dimensions and chemical components of individual pores of the adsorbent, capillary condensation will occur over a range of temperatures. The greater the amount of capillary condensation during adsorption, the greater is the amount of water present on the adsorbent at the start of the desorbent step. To the extent that this greater amount of water is desorbed during the desorption step, the greater is the amount of water withdrawn from the reactor undergoing regeneration and returned or recycled to the reactor.

The capillary condensation temperature can be approximately determined from a graph of the weight of water adsorbed on the adsorbent as a function of adsorption temperature of the flue gas. As temperature is decreased from above the range of capillary condensation temperatures into the range of temperatures where capillary condensation occurs, the slope of the graph increases dramatically. While the change in slope may occur over a range of temperatures rather than at one particular temperature, the change is nevertheless apparent to a person of ordinary skill in the art. For example, if the upper end of the range of capillary condensation temperature is 149° C. (300° F.), the change in the weight of water adsorbed may be only about 1.5 wt-% as the temperature is decreased from about 427° C. (800° F.) to about 149° C. (300° F.), but may be about 4 wt-% as the temperature is further decreased from about 149° C. (300° F.) to about 121° C. (250° F.). In addition, a person of ordinary skill in the art can estimate the capillary condensation temperature by estimating the difference between the dew point temperature of the bulk flue gas and the capillary condensation temperature using well-known correlations and theoretical techniques that take into account the dimensions of the adsorbent's capillaries and other factors, and then adding that difference to the measured dew point temperature.

Despite decreasing the adsorption temperature to increase halogen recovery, halogen recovery may nevertheless be unacceptably low, because of frequent or excessive breakthrough of halogen into the outlet of the adsorption bed 108. In this case, other embodiments of the process disclosed herein can be used to further improve halogen recovery. Instead of, or subsequent to, operating the desorption bed 138 so that the outlet conditions of desorption bed 138 are maintained the same as, or substantially the same, the desorption operating variables may be selected more independently of the regeneration conditions. In these other embodiments of the process disclosed herein, desorption operating conditions are selected with the objective of decreasing the final halogen content of the adsorbent at the end of the desorption step. This objective can be met in several ways. First, the desorption temperature can be increased to a temperature above the desired regeneration inlet temperature. Heater 86 can heat the gases entering desorption bed 138, and exchanger 154 can cool the exiting gases to the desired temperature for combining any make-up streams in lines 92 and 96 and achieving a desired inlet temperature of off-stream reactor 64. Second, the desorption step can be prolonged beyond the point when the outlet molar ratio of water to halogen increases above that desired. In that case, line 92 may be used to add halogen to the gases flowing in line 94, thereby lowering the molar ratio to the desired range for the inlet of the off-stream reactor 64.

Even if halogen recovery is within the desired range, the outlet conditions of the desorption bed 138 may not be what is desired for mixing the exiting gases with the make-up streams flowing in lines 92 and 96 to achieve the desired inlet conditions of the off-stream reactor 64. For example, the molar ratio of water to halogen in the gases flowing through line 140 may be lower than desired to attain a given molar ratio at the inlet of the off-stream reactor 64. This can happen if too much halogen is being desorbed too rapidly from the desorption bed 138, such as when desorption is starting on a bed of adsorbent that adsorbed an excessive amount of halogen or when the gas is flowing through the bed at an excessive rate. In these situations, a surge of halogen may be desorbed from the bed, resulting in an unacceptably low molar ratio of water to halogen in the gases flowing through line 140. In these circumstances, either or both of two other embodiments of the process disclosed herein are useful. First, line 96 may be used to add water to the gases flowing through line 94, thereby raising the molar ratio to the desired range for the inlet of off-stream reactor 64. Second, valve 144 may be opened to bypass desorption gases around desorption bed 138, thereby decreasing the amount of halogen that is desorbed from the adsorbent in desorption bed 138 and effectively raising the molar ratio of the gases flowing through line 60 to the desired range. In either event, once the molar ratio of water to halogen in the gases flowing through line 140 increases to the desired range, the water addition or the desorption gas bypassing may be decreased or stopped.

When halogen breakthrough occurs in the effluent of the bed of adsorbent that is being used for adsorption, the bed is removed from adsorption mode, and is subsequently used for desorption. The duration of time that the bed is in adsorption mode and the frequency at which the bed is removed from adsorption mode depends on many factors. These factors include the adsorption conditions, the type and amount of adsorbent, the type of halogen-containing materials, the maximum capacity of the adsorbent for halogen at adsorption conditions, the halogen content of the adsorbent, the molar ratio of water to halogen in the stream entering the bed of adsorbent, and the halogen concentration in the adsorbent bed. A bed of adsorbent used in adsorption mode adsorbs usually at least 90 wt-%, and preferably at least 99 wt-%, of the halogen in the stream entering the bed of adsorbent. If less halogen than that is adsorbed by the bed of adsorbent, the bed is removed from adsorption mode and replaced with another bed.

Although the description of the process disclosed herein has been mainly in terms of two beds of adsorbent, one in use for adsorption and the other in use for desorption, there may of course be more beds of adsorbent, and at any given time some of these other beds might be in use for adsorption, desorption, or neither. One or more beds of adsorbent may have already been used for adsorption and are awaiting desorption, while others have been used for desorption and are awaiting adsorption. Such additional adsorbent beds may be desirable for several reasons. First, one or more additional beds may be useful if there is a heating step between the adsorption and desorption steps, to preheat the relatively cool adsorbent after adsorption and prior to desorption. Also, additional beds may be used if there is a cooling step after desorption and prior to adsorption. Third, additional beds may be used if the adsorbent beds have a relatively small capacity for halogen relative to the amount of halogen that may be removed from the off-stream reactor bed 64 and vented through line 98. Fourth, additional beds could function as a "reservoir" for halogen that had been removed from the off-stream reactor but which had not yet been returned to the reactor. Such a situation may arise when the regeneration conditions do not require that halogen removed from the catalyst be returned immediately to the off-stream reactor.

A fifth reason that additional beds may be desirable is that the additional beds may be used to maximize halogen recovery. In one example, a bed that is being used for adsorption could be replaced with a fresh bed either long before any halogen breaks through at the outlet of the bed or well prior to when the halogen content of the adsorbent in the bed in adsorption mode has reached its maximum content. By not operating the adsorption bed to the point of maximum possible halogen loading, the full halogen capacity of the adsorbent may not be utilized, but since the risk of halogen breakthrough is minimized, halogen recovery is maximized. In another example, two beds containing adsorbent could be used in a series flow arrangement for a "lead-lag" adsorption operation. The first bed in the series, or the "lead" bed, could be used for adsorption up to or even after either halogen breaks through at the outlet of the "lead" bed, or the halogen content of the adsorbent in the "lead" bed has reached its maximum. The second bed in the series, or the "lag" bed, could adsorb any halogen that breaks through the "lead" bed. By operating the "lead" bed to the point of its maximum possible halogen loading, the full halogen capacity of the adsorbent in the "lead" bed is utilized while still maximizing halogen recovery. When halogen breakthrough has occurred in the outlet of the "lead" bed, the "lead" bed is removed from adsorption mode and replaced with the "lag" bed, and the "lag" bed is replaced with a bed that has been used for desorption.

As previously described, halogen recovery is affected by the difference between the halogen content of the adsorbent prior to adsorption (i.e., after desorption) and the halogen content of the adsorbent after adsorption (i.e., prior to desorption). Generally, the greater the difference in halogen contents, the greater is the halogen recovery. Suitable halogen recoveries are achieved when the difference between the halogen content of the adsorbent prior to adsorption (i.e., after desorption) and the halogen content of the adsorbent after adsorption (i.e., prior to desorption) is from about 0.2 to about 2.0 wt-% halogen, and preferably from about 0.5 to about 1.0 wt-% halogen, based on the weight of the adsorbent.

The difference in halogen contents of the adsorbent depends on many factors, including the flow rates and compositions of the gases flowing through the adsorption and desorption beds, the adsorbent, the quantities of adsorbent used for adsorption and desorption, and other adsorption and desorption conditions, especially the difference between the adsorption and desorption temperatures. As long as there is some difference in the adsorption and desorption temperatures, then some adsorption of halogen will generally occur. With all other conditions being the same, the greater the difference in adsorption and desorption temperatures, the greater is the recovery of halogen. This increased recovery is due to either an increase in halogen pickup during adsorption (due to a lower adsorption temperature) or an increase in halogen removal during desorption (due to a higher desorption temperature). The difference in the adsorption and desorption temperatures is usually more than about 55° C. (100° F.). The difference in halogen contents also depends on the molar ratios of water to halogen during adsorption and desorption. The ratio of the molar ratio of water to halogen during adsorption to the molar ratio of water to halogen during desorption is generally from about 0 to about 2.

The relationship between, on the one hand, halogen recovery and, on the other hand, the flow rates and halogen concentrations of the streams during adsorption and desorption and the amount of adsorbent used for adsorption and desorption is that of a halogen material balance. Thus, assuming that the adsorbent in the adsorption bed has adequate capacity to adsorb a desired amount of halogen, it is possible to adsorb that amount either by using a relatively high flow rate of the gas at a relatively low inlet concentration of halogen or by using a relatively low flow rate of the gas at a relatively high concentration of halogen. Similarly, a desired amount of halogen can be desorbed from the desorption bed with either a relatively high or low flow rate of gas or with a relatively low or high concentration of halogen.

I claim:

1. A process for the regeneration of a hydrocarbon conversion catalyst in the presence of halogen, the process comprising:
   (a) contacting a regeneration inlet stream comprising halogen with catalyst in a catalyst bed to at least partially regenerate the catalyst in the catalyst bed, and withdrawing a regeneration effluent stream comprising halogen from the catalyst bed;
   (b) contacting a first portion of the regeneration effluent stream with adsorbent in a first adsorbent bed, removing halogen from the first portion of the regeneration effluent stream and adsorbing halogen on adsorbent in the first adsorbent bed, and recovering an adsorption effluent stream from the first adsorbent bed;
   (c) contacting a second portion of the regeneration effluent stream with adsorbent in a second adsorbent bed, the adsorbent in the second adsorbent bed having halogen adsorbed thereon, desorbing halogen from the adsorbent in the second adsorbent bed, and withdrawing a desorption effluent stream comprising halogen from the second adsorbent bed; and,
   (d) forming the regeneration inlet stream from at least a portion of the desorption effluent stream.

2. The process of claim 1 wherein at least one of the adsorbent in the first adsorbent bed and the adsorbent in the second adsorbent bed is selected from the group consisting of a molecular sieve, silica gel, carbon, and alumina.

3. The process of claim 1 further characterized in that the functions of the first adsorbent bed and the second adsorbent bed are at least periodically shifted by operating the first adsorbent bed as the second adsorbent bed and operating the second adsorbent bed as the first adsorbent bed.

4. The process of claim 3 wherein at least one of the adsorbent in the first adsorbent bed and the adsorbent in the second adsorbent bed comprises a hydrocarbon conversion catalyst.

5. The process of claim 3 wherein the catalyst and at least one of the adsorbent in the first adsorbent bed and the adsorbent in the second adsorbent bed have the same composition.

6. The process of claim 3 further characterized in that the adsorbent in the second adsorbent bed has a pre-adsorption halogen content prior to the shifting of functions, the adsorbent in the first adsorbent bed has a post-adsorption halogen content prior to the shifting of functions, and the difference between the pre-adsorption halogen content and the post-adsorption halogen content is from about 0.2 to about 2.0 wt-% halogen, based on the weight of adsorbent.

7. The process of claim 1 wherein the catalyst is selected from the group consisting of a reforming catalyst, an isomerization catalyst, and a dehydrogenation catalyst.

8. The process of claim 1 wherein the at least partial regeneration of the catalyst is selected from the group consisting of burning carbon deposits on the catalyst, redispersing a metal on the catalyst, adding halogen to the catalyst, drying the catalyst, and reducing a metal on the catalyst.

9. The process of claim 1 wherein the regeneration inlet stream comprises a component selected from the group consisting of oxygen, hydrogen, nitrogen, and a $C_1$–$C_5$ hydrocarbon.

10. The process of claim 1 further characterized in that at least about 80 percent of the halogen in the first portion of the regeneration effluent stream is adsorbed on the adsorbent in the first adsorbent bed.

11. The process of claim 1 further characterized in that the first adsorbent bed operates at adsorption conditions comprising a temperature of less than about 482° C. and a molar ratio of water to halogen of more than 5:1.

12. The process of claim 1 further characterized in that the adsorbent in the first adsorbent bed has a capillary condensation temperature at the adsorption conditions, and the adsorption conditions comprise a temperature of greater than the capillary condensation temperature.

13. The process of claim 1 wherein the halogen is chlorine or fluorine.

14. The process of claim 1 wherein the halogen in the regeneration effluent stream is in a component selected from the group consisting of hydrogen chloride and molecular chlorine.

15. The process of claim 1 further characterized in that the regeneration inlet stream has a regeneration inlet temperature and a regeneration inlet molar ratio of water to halide, the desorption effluent stream has a desorption effluent temperature and a desorption effluent molar ratio of water to halide, the difference between the regeneration inlet temperature and the desorption effluent temperature is less than about 20° C., and the difference between the regeneration inlet molar ratio and the desorption effluent molar ratio is less than about 20:1.

16. The process of claim 1 further characterized in that the first adsorbent bed operates at adsorption conditions comprising an adsorption temperature and an adsorption molar ratio of water to halogen, the second adsorbent bed operates at desorption conditions comprising a desorption temperature and a desorption molar ratio of water to halogen, the difference between the desorption temperature and the adsorption temperature is more than about 55° C., and the ratio of the adsorption molar ratio to the desorption molar ratio is from about 0 to about 2.

17. The process of claim 1 further characterized in that a component consisting of at least one of water and a compound that can react to form water is introduced into the process and water contacts the adsorbent in the second adsorbent bed.

18. The process of claim 1 further characterized in that at least one of the first portion of the regeneration effluent stream and the second portion of the regeneration effluent stream is cooled.

19. A adsorptive method for recovering a chlorine-containing material from the outlet stream of a cyclic regeneration operation of a hydrocarbon conversion process using a catalyst, the method comprising:
  (a) passing hydrocarbons to a first catalyst bed containing catalyst and converting the hydrocarbons;
  (b) passing a regeneration inlet stream comprising a chlorine-containing material to a second catalyst bed containing catalyst, at least partially regenerating the catalyst in the second catalyst bed at regeneration conditions and in the presence of chlorine-containing material, and recovering from the second catalyst bed a regeneration effluent stream comprising chlorine-containing material;
  (c) passing a first portion of the regeneration effluent stream comprising chlorine-containing material to a first adsorbent bed containing adsorbent, removing at least about 80 percent of the chlorine-containing material in the first portion of the regeneration effluent stream and adsorbing chlorine-containing material on the adsorbent in the first adsorbent bed, and recovering an adsorption effluent stream from the first adsorbent bed;
  (d) contacting a second portion of the regeneration effluent stream comprising chlorine-containing material to a second adsorbent bed containing adsorbent, the adsorbent in the second adsorbent bed having chlorine-containing material adsorbed thereon, desorbing chlorine-containing material from the adsorbent in the second adsorbent bed, and withdrawing a desorption effluent stream comprising chlorine-containing material;
  (e) forming the regeneration inlet stream from at least a portion of the desorption effluent stream;
  (f) at least periodically shifting the functions of the first adsorbent bed and the second adsorbent bed by operating the first adsorbent bed to function as the second adsorbent bed and operating the second adsorbent bed to function as the first adsorbent bed; and
  (g) at least periodically shifting the functions of the first and second catalyst beds by operating the first catalyst bed to function as the second catalyst bed and operating the second catalyst bed to function as said the catalyst bed.

20. The method of claim 19 wherein the chlorine-containing material comprises at least one of hydrogen chloride and molecular chlorine.

* * * * *